United States Patent [19]

Snyder

[11] Patent Number: 5,904,964
[45] Date of Patent: *May 18, 1999

[54] PROCESS FOR MANUFACTURING HEAT-SHRINKABLE POLYETHYLENE FILM

[75] Inventor: John Douglas Snyder, Clinton, Iowa

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/301,158

[22] Filed: Sep. 6, 1994

Related U.S. Application Data

[63] Continuation of application No. 07/982,603, Nov. 25, 1992, abandoned, which is a continuation-in-part of application No. 07/592,707, Nov. 10, 1990, abandoned, which is a continuation-in-part of application No. 07/451,977, Dec. 18, 1989, abandoned.

[51] Int. Cl.[6] .............................. B29C 55/28; C08L 23/08
[52] U.S. Cl. ........................ 428/35.1; 428/910; 525/240; 526/348.1
[58] Field of Search ........................ 525/240; 526/348.1; 428/35.1, 910

[56] References Cited

U.S. PATENT DOCUMENTS

| 2,839,515 | 6/1958 | Davison et al. | 260/88.1 |
|---|---|---|---|
| 2,870,130 | 1/1959 | Davison et al. | 260/94.9 |
| 3,141,912 | 7/1964 | Goldman et al. | 264/95 |
| 4,457,960 | 7/1984 | Newsome | 525/222 |
| 4,597,920 | 7/1986 | Golike | 264/22 |
| 4,760,116 | 7/1988 | Roberts | 525/221 |
| 4,820,557 | 4/1989 | Warren | 428/349 |
| 5,091,228 | 2/1992 | Fujii et al. | 525/240 |
| 5,112,696 | 5/1992 | Roberts | 525/240 |

FOREIGN PATENT DOCUMENTS

| 57-128729 | 8/1982 | Japan . |
|---|---|---|
| 60-257232 | 12/1985 | Japan . |
| 61-028538 | 2/1986 | Japan . |
| 61273-930 | 12/1986 | Japan . |
| 6210-150 | 1/1987 | Japan . |
| 62-064846 | 3/1987 | Japan . |
| 62-64846 | 3/1987 | Japan . |

*Primary Examiner*—Donald R. Wilson
*Attorney, Agent, or Firm*—Patricia L. Kelly

[57] ABSTRACT

Linear low density copolymer of ethylene/1-hexene is made processable into heat shrinkable film by a continuous process starting with the extrusion of the copolymer as a film. The production rate of heat shrinkable film made from linear low density copolymer of ethylene/1-octene-can be increased by the step of blending a minor proportion of highly branched low density polyethylene with either copolymer prior to extrusion.

4 Claims, No Drawings

PROCESS FOR MANUFACTURING HEAT-SHRINKABLE POLYETHYLENE FILM

CROSS-REFERENCE TO RELATED APPLICATION

This is a continuation, of application Ser. No. 07/982,603 filed Nov. 25, 1992, now abandoned, which is a continuation-in-part of application Ser. No. 07/592,707 filed Nov. 10, 1990 ABN which is a continuation-in-part of application Ser. No. 07/451,977, filed Dec. 18, 1989 ABN.

BACKGROUND OF THE INVENTION

1. Field of the Invention

This invention relates to an improvement in the process of making heat shrinkable film and to the resultant film of certain linear low density polyethylene ("LLDPE") polymers.

2. Description of Related Art

Heat shrinkable polymer film is typically made by extruding polymer from a melt into a film, followed by orienting the film by stretching it under temperature conditions where molecular orientation of the film occurs and the film does not tear. The film is then cooled in the stretched state, and upon subsequent heating, the film shrinks in seeking to cover its original dimensional state.

Irradiation of the film has been used prior to stretching to crosslink the film (polymer), thereby increasing resistance to tearing during stretching, but this has the twofold disadvantage of the increased cost of radiation and the inability to recycle through melt processing of any scrap generated in the heat shrinkable film manufacture.

The process described in U.S. Pat. No. 3,141,912 for making heat shrinkable film has achieved commercial utility for certain polymers without the need for irradiation of the film prior to stretching. In the continuous process of this patent, the polymer is extruded as a film in tubular form, the tube is quenched to a temperature below the orientation temperature range and is reheated to the orientation temperature range, followed by biaxially stretching of the film of the tube while within this temperature range. The biaxial stretch is done by (a) using internal gas pressure to expand the diameter of the tube to form a large "bubble" and (b) advancing the expanded tube at a faster rate than the extrusion rate, so as to obtain transverse and machine directions of orientation, respectively. Usually, the stretch is at least 3× in each direction. The film is then cooled and rolled up in the cooled state so as to retain the property of heat shrinkability.

U.S. Pat. No. 4,820,557 discloses the manufacture of multilayer heat shrinkable film in which one of the layers is a linear copolymer of ethylene with either 1-octene or 1-hexene, the linear copolymer having specified melt flow ratios which indicate a narrow molecular weight distribution and a density of 0.935 g/cc or less. The layer is also disclosed as being a blend of this copolymer with a large number of other polymers, including low density polyethylene ("LDPE"). The manufacture of the heat shrinkable film in this patent, however, is disclosed to involve radiation of the film prior to stretching.

Japanese Pat. Publication 60-257,232 (1985) discloses the compounding of LDPE and LLDPE together with a free-radical generator to cause the polymers to crosslink in the film extruder. The film is produced on a conventional blown film process in which the bubble is blown at or near the polymer's melting point. The film has little to no orientation and is not heat shrinkable. Bags of the resultant film are disclosed to have good heat seal strength.

U.S. Pat. No. 4,597,920 discloses the manufacture of heat shrinkable film by the process of U.S. Pat. No. 3,141,912 wherein the linear copolymer is of ethylene with at least one $C_8$–$C_{18}$ alpha-olefin, the copolymer having a melt index of 0.1 to 4.0 g/10 min, density of 0.900 to 0.940 g/cc, a broad molecular weight distribution as indicated by the stress exponent being above 1.3, and having two distinct crystallite melting regions (melting points) at least 10° C. apart. The patent also discloses that irradiation of extruded film prior to stretching is optional. In fact, the presence of the two distinct melting regions in the copolymer has enabled the heat shrinkable film of ethylene/1-octene copolymer to be made on a commercial basis without crosslinking prior to stretching. This commercial film is called Clysar® LLP shrink film.

Included in this patent is the disclosure in Table IV of blending increasing amounts of low density branched polyethylene with ethylene/1-octene copolymer; a decrease in film shrink force is the reported result. This aspect of the disclosure did not progress beyond the laboratory work reported wherein the stretching of film of the blends was done on a laboratory stretcher in an operation which was discontinuous from the film formation by melt pressing.

Despite the commercial success of the heat shrinkable film of ethylene/1-octene copolymer of U.S. Pat. No. 4,597,920, it has been desired to increase the economy of manufacture of this film without undertaking the expense of irradiation of the film prior to stretching and without being subject to the penalty of having non-melt processible scrap from the film manufacture. One way of economizing would be to increase the rate of production of the film on the same manufacturing equipment. The rate of production of this heat shrinkable film has been limited to the difficulty of achieving the temperature control required for orienting the film within the stretching zone of the manufacturing machine. The film extrusion rate has to be adjusted so that the machine direction stretch desired can be obtained with the "bubble" being stably positioned in the stretching zone of the manufacturing equipment, including the shape of the bubble being symmetrical, indicating that uniform stretching of the film is present. This condition of bubble stability provides the condition for biaxial orientation without causing tearing of the film during stretching. If the extrusion rate could be increased without causing tearing and without reducing the machine direction stretch, then a greater amount of heat shrinkable film would be obtained from the same manufacturing equipment. In the case of LLDPE wherein the copolymer is ethylene/1-hexene, the problem of producing heat shrinkable film without crosslinking prior to stretching is different. Such production is hardly possible at all. Thus, the production of heat shrinkable film from this copolymer without crosslinking prior to stretching does not appear to be reported in the prior art. The temperature required for orientation is so close to the melting point of the copolymer that film tearing occurs at even low extrusion rates. Because of this close proximity between orientation temperature and melting point, the strength of the copolymer is very low, which is responsible for the propensity of the film to orient non-uniformly and tear. It was for this reason that U.S. Pat. No. 4,597,920 required the alpha-olefin comonomer with ethylene to contain at least 8 carbon atoms, thereby excluding the disclosure of 1-hexene.

Furthermore, U.S. Pat. No. 4,597,920 requires LLDPE octene copolymer must have two distinct crystalline melting regions.

SUMMARY OF THE INVENTION

The present invention solves several problems described hereinbefore; namely, it enables LLDPE wherein the alpha-monoolefin comonomer is 1-hexene to be used to be made into heat shrinkable film without tearing and it enables the production rate for LLDPE wherein the alpha-monoolefin comonomer is 1-octene to be significantly increased without causing any increase in film tearing. These improvements are obtained without crosslinking the LLDPE prior to stretching.

More specifically, the present invention can be described as an improvement in the continuous process for making heat shrinkable film from a linear copolymer of ethylene with 5 to 20% by weight based on the weight of the copolymer of a comonomer selected from the group consisting of 1-hexene or 1-octene, said copolymer having a density of 0.900 to 0.935 g/cc, by extruding the copolymer into a film, and stretching said film biaxially by a factor of at least 3× in each direction without prior crosslinking, the improvement comprising blending with said copolymer prior to extrusion from 5 to 40% by weight of low density branched polyethylene (LDPE) based on the weight of the resultant blend.

In one embodiment of this invention, when the co-monomer is 1-hexene, the addition of the LDPE to the LLDPE, makes the resultant blend usable to make high quality heat shrinkable film, uniformly stretched and without tearing, at reasonable rates, whereas neither this particular LLDPE nor the LDPE by itself has this capability in the aforesaid process. Another embodiment of this invention resides in the resultant heat shrinkable film free of crosslinking and capable of shrinking upon application of heat at least 10% in each direction opposite from the directions of biaxial orientation, and being of a blend of 60 to 95% by weight of a linear copolymer of ethylene with 5 to 20% of 1-hexene based on the weight of the Copolymer, said copolymer having a density of 0.900 to 0.935 g/cc, with 5 to 40% by weight of low density branched polyethylene based on the weight of the blend.

In still another embodiment of this invention, when the co-monomer is 1-octene, the addition of the LDPE to the LLDPE, enables the extrusion rate for the resultant blend to be increased so as to provide increased economy, without penalty to the desired properties for the resultant heat shrinkable film as compared to the film of this particular LLDPE by itself.

DESCRIPTION OF THE PREFERRED EMBODIMENTS

The process for making the heat shrinkable films in accordance with the process of the present invention is conventional except for the addition of LDPE to the LLDPE polymers described and the results achieved as described above. Further description of the process is provided by U.S. Pat. No. 4,597,920 and the U.S. Pat. No. 3,141,912 and in the description of the latter patent hereinbefore as well as at col. 4, lines 1 to 22 of U.S. Pat. No. 4,760,116.

Preferably, the extrusion of the film in the process used in the present invention is in tubular form and the stretching of the film is at least 3× in biaxial directions and more preferably at least 3.5× in the machine direction and at least 4× in the transverse direction. Preferably, at these same biaxial orientations, the extrusion rate for the blend containing the ethylene/1-octene copolymer is at least 5% greater by the process of the present invention as compared to the maximum extrusion rate achievable without the addition of LDPE. In the case of ethylene/1-octene copolymer, the current extrusion rate of 16.5 m/min is preferably increasable to at least 17.5 m/min and more preferably to at least 18 m/min. Preferably the orientation temperature (temperature of stretching) is at least 10° C. below the melting point of the film. When the copolymer present has a major and minor melting point (lower than the major melting point), the orientation temperature is preferably at least 10° C. below the major melting point. The extrusion temperature will generally be in the range of 215 to 235° C., and the melting point (or major m.p.) of the polymer blend will generally be in the range of 115–130° C. The quenching of the extruded film will generally involve cooling the film to ambient temperatures. The film is then reheated to the orientation temperature for stretching. The orientation temperature is in fact a temperature range, believed to be at least 5° C., so that the film has some latitude to be stretchable without tearing. The quench/reheat method provides a controlled approach for achieving the orientation temperature desired for high production rates. The blend is not crosslinked prior to stretching, i.e., it is neither irradiated after extrusion but prior to stretching nor is a radical generator added to the blend prior to extrusion to cause crosslinking to be present in the film extrudate.

The LLDPE used in the present invention is a linear copolymer of ethylene with either 1-hexene or 1-octene as described above. These copolymers are prepared by conventional low pressure polymerization methods using a transition metal catalyst such as described in U.S. Pat. No. 4,597,920. This LLDPE has mainly short chain branches of the pendant group of the 1-hexene or 1-octene comonomer and has little to no long chain branches from the main polymer chain. Typically, the copolymer will have a melt index of 0.1 to 4.0 g/10 min, preferably of 0.5 to 2.0 g/10 min and density of 0.900 to 0.935 g/cm3, preferably of 0.910 to 0.930 g/cm3. In the case of the 1-octene copolymer, the LLDPE preferably has a stress exponent above 1.3.

The 1-octene content of the copolymer is preferably from 8 to 16% by weight based on the weight of the copolymer. The preferred proportion of 1-hexene in the LLDPE is from 6 to 15% by weight based on the weight of the copolymer. In each case, the ethylene content will be complemental to the proportion of comonomer, to total 100% of the weight of the copolymer.

The LLDPE may contain slip and anti-blocking agents such as 1500 to 3000 ppm of erucamide and 1000 to 2000 ppm of powdered silica, and other conventional additives for the polymer. These small amounts of additive are included in the weight proportions of LLDPE in the blends with LDPE described herein.

The low density branched polyethylene, used in the present invention, sometimes abbreviated as LDPE herein, means a tubular (branched), low-density polyethylene having a density of about 0.920 to about 0.925, preferably about 0.923. This component is a highly branched low density polyethylene prepared in a tubular reactor. A tubular reactor, like an autoclave, employs high pressures and produces resin in the density range of about 0.917 to about 0.928. In the tubular reactor, ethylene containing a free radical initiator is passed through a preheater where it is heated to 0100° C.–200° C. The mixture is passed through a tube where it heats to 250° C.–300° C. as polymerization occurs, although some of the heat is removed by cooling. Pressure, temperature, and type of initiator are all variables that affect the properties of the resin in a manner which is known to those skilled in the art. Tubular polymerization reactions are described, for example, in U.S. Pat. Nos. 2,870,130 and 2,839,515.

The distinctions between tubular resins and ordinary resin made e.g. in a high-pressure autoclave process are subtle but important. Such high pressure tubular resins have some desirable properties that are similar to those of LLDPE and some similar to those of ethylene vinyl acetate copolymer. The tubular resins exhibit low modulus, high elongation, and relatively high impact strength compared to similar autoclave resins, and have a soft "feel" similar to that of ethylene copolymer such as ethylene vinyl acetate. Tubular resins mix well with LLDPE and with ultra-low density polyethylene ("ULDPE"), producing clear films. Autoclave resins of similar gross properties produce a much hazier film. Resins from the tubular process also operate more smoothly in the film forming and packaging process of the present invention. The reasons for these observed differences are not clearly known, but are believed to arise from a higher degree of molecular weight distribution and/or branching in the resins from the tubular process. The higher the value for $M_m/M_n$, the greater the molecular weight distribution. The Mw/Mn for suitable materials should be at least about 8, preferably at least about 10, and most preferably about 11 to about 14.

The melt index of the branched LDPE is preferably about 1 to about 3 and most preferably about 1.9 g/10 min, determined according to ASTM D1238 (condition E). The LDPE preferably has a melting point of at least 10° C. less than the melting point of the LLDPE used in the present invention. If the LLDPE has two melting points, then the melting point of the LDPE is preferably at least 10° C. less than the higher of the two melting points. The LDPE may also contain small amounts of additives, such as those commonly found in LDPE, namely slip and anit-block additives, which do not interfere with the effect of the LDPE in the blend. Copolymers of ethylene containing a small amount of another ethylenically unsaturated comonomer, that are made by the conventional process of high pressure polymerization involving a free radical catalyst, can also be used in this invention. When such a copolymer is used, the comonomer content will generally not exceed 12% by weight based on the weight of the copolymer. The preferred comonomer is vinyl acetate for reasons of economy of the copolymer, but many other small amounts of comonomer can be used as will be recognized by one skilled in the art and still obtain the improvements described herein.

The proportion of LDPE in the blends with the LLDPE used in the present invention will be selected as an effective amount to provide the improved results hereinbefore noted, depending on the particular LLDPE used. While this improvement can be realized within the 5 to 30 or 40% by weight range, the preferred amounts of LDPE in the blend will be from 10 to 35% by weight, and within this range either 20 to 35% or 15 to either 25 is or 30% by weight of the blend when the comonomer in the LLDPE is 1-hexene and from 10 to 25% or 15 to 30% by weight of the blend when the comonomer is 1-octene, these weight percents being based on the total weight of the blend.

The LDPE and LLDPE components of the blend used in the present invention can be dry blended in the desired ratio by conventional mixing means, with the components generally being in the form of molding granules. The resultant dry blend can then be fed to the extruder which forms the film. Homogeneity of the blend may be improved by melt blending the components and additives together and feeding molding granules of the resultant melt blend to the extruder which forms the film. The heat shrinkable films made according to the present invention are characterized by uniform shrinkability in biaxial directions arising from the uniform orientation achieved in the stretching operation These films are useful for packaging and wrapping of articles in the same way as heat shrinkable films have been used heretofore. Typically, the heat shrinkable films made according to the present invention will be used as monolayer films having uniform thickness of 0.013 (0.5 mil) to 0.051 (2.0 mils) mm. These heat shrinkable films may be irradiated if desired and/or combined with other materials as a layer in a multilayer structure for achievement of specific properties, e.g., barrier properties not exhibited by the monolayer itself.

Examples of the present invention are as follows (parts and percents are by weight unless otherwise indicated):

EXAMPLE 1

A blend of 20% by weight of LDPE with 80% by weight of LLDPE was prepared by melt blending. The LLDPE was a linear copolymer of ethylene with about 11% by weight based on the weight of the copolymer of 1-octene. The copolymer had major and minor melting points of 122 and 109° C., respectively, a melt index of 1.1 g/10 min., and density of 0.921 g/cc and contained 5 2000 ppm erucamide and 1300 ppm of powdered silica. The LDPE is highly branched ethylene homopolymer having a melting point of 109° C., a melt index of 1.9 g/10 min., and density of 0.923 g/cc. Granules of the blend were fed to an extruder. The blend was extruded into a tubular film, quenched, reheated to the stretching temperature range, stretched biaxially and cooled in the stretched state so as to form heat shrinkable film 0.75 mil (0.02 mm) thick by the conventional continuous process of U.S. Pat. No. 3,141,912. Details of the process were as follows: extrusion temperature 230° C., quench temperature 25° C., temperature range of reheat (orientation temperature of the film) about 105 to 110° C., degree of stretch obtained by blowing the reheated tubular form of the film into a bubble and using take-up rolls operating at a surface speed greater than the extrusion rate was 4× in the machine direction and 5× in the transverse direction. The hoop stress on the film in the bubble caused by the introduction of air under pressure within the extruded tube was 16,548 kpa (2,400 psi). For comparison purposes, the same LLDPE but by itself was subjected to the same process. The results of these runs are shown in the following Table.

TABLE I

|  | LLDPE | 80:20 blend of LLDPE with LDPE | |
| --- | --- | --- | --- |
| Extrusion Rate | 16.5 m/min | 17.5 m/min | 18.5 m/min |
| High shrinkable film properties | | | |
| Haze, % | 2.1 | 2.0 | 1.9 |
| Gloss | | | |
| Bis | 131 | 136 | 144 |
| Bos | 136 | 138 | 135 |
| Transparency, % | 70 | 77 | 76 |
| Shrinkage, % (102° C.) | | | |
| MD | 23 | 23 | 24 |
| TD! | 30 | 33 | 34 |
| Modulus, mPa | | | |
| MD | 283 | 276 | 276 |
| TD | 283 | 283 | 276 |
| Tensile Str., mPa | | | |
| MD | 76 | 83 | 69 |
| TD | 90 | 83 | 90 |

TABLE I-continued

| | LLDPE | 80:20 blend of LLDPE with LDPE | |
|---|---|---|---|
| Extrusion Rate | 16.5 m/min | 17.5 m/min | 18.5 m/min |
| Elongation, % | | | |
| MD | 167 | 133 | 151 |
| TD | 152 | 127 | 127 |
| Coef. of Friction | | | |
| Bis | 0.12 | 0.10 | 0.09 |
| Bos | 0.11 | 0.09 | 0.11 |
| Elmendorf, Tear, g | | | |
| MD | 42 | 50 | 52 |
| TD | 43 | 41 | 46 |

The extrusion rate of 16.5 m/min for the film of the LLDPE by itself was the maximum that the film bubble could tolerate without becoming unstable. Table I shows that the extrusion rate can be increased by as much as 12% for the film of the LLDPE/LDPE blend without any significant sacrifice in film properties, including without any decrease in machine direction stretch. Of course the film take up roll speed was increased to maintain the same degree of machine direction stretch as the extrusion rate was increased. At the higher rate of production of heat shrinkable film, the manufacturing process using the film blend in accordance with the present invention appeared to operate as smoothly, i.e., without machine downtime caused by film tearing, as the process using the LLDPE by itself operating at the lower (but maximum for it) extrusion rate.

Heat shrinkable film made by the process of the present invention such as by the procedure described in this Example can be irradiated for the purpose of increasing burn-through resistance when heat is applied to cause the film to shrink wrap an article enclosed within it. Such heat may overheat portions of the film which are not in contact with the article at the time of heating and this overheating can cause the film to melt and form a hole in the shrink wrap, this hole being referred to as "burn-through". This irradiation can be carried out in an operation separate from the manufacture of the heat shrinkable film, permitting all scrap to be recovered from the film manufacture such as by trimming the film edges prior to irradiation, so that the scrap is recyclable via melt processing.

Heat shrinkable film made solely of the LLDPE used in this Example exhibits burn-through at about 360° F. (182° C.). When subjected to irradiation of 2 megarads, the burn-through temperature of the film increased to 395° F. (202° C.). Heat shrinkable film of the blend used in this Example exhibited a burn-through temperature of 390° F. (199° C.) when subjected to the same irradiation and burn-through test.

EXAMPLE 2

Attempts were made to form heat shrinkable film by the continuous process of U.S. Pat. No. 3,141,912 using a linear copolymer of ethylene with about 9% by weight of 1-hexene, the copolymer having a single melting point of 122° C., a density of 0.918 g/cc and melt index of 1.0 g/10 min on a different production line than used in Example 1. Various extrusion temperatures, reheating temperatures, and biaxial stretching amounts were tried, but it was not possible to produce a stable bubble. Typically, the film would not orient uniformly as indicated by thick and thin sections appearing in the bubble. Dry blending of 20% by weight of the LDPE used in Example 1 with the ethylene/1-hexene copolymer, followed by extrusion in accordance with the continuous process of U.S. Pat. No. 3,141,912, resulted in easy formation of a stable bubble and uniform heat shrinkable film. The process conditions used for successful operation were as follows: extrusion temperature was 225–230° C., extrusion rate was 2 m/min., orientation temperature of the film was 105 to 110° C., and hoop stress of the film in the bubble was 11,721 kpa (1,700 psi). The LLDPE copolymer of Example 1 was run under the same conditions so that the resultant heat shrinkable film properties could be compared, as shown in Table II.

TABLE II

| | Ethylene/1-octene copolymer of Example 1 | Ethylene/1-hexene copolymer Blended with LDPE (80:20) |
|---|---|---|
| Film gauge | 0.032 mm (1.2 mil) | 0.029 mm (1.1 mil) |
| Haze, % | 1.2 | 1.5 |
| Gloss | 158 | 154 |
| Transparency | 82 | 73 |
| Shrinkage, % (102° C.) | | |
| MD | 20 | 19 |
| TD | 27 | 30 |

The properties of the film made from the blend compare favorably with the properties of the film made from the ethylene/1-octene copolymer by itself. The extrusion rate used was believed to be much less than the maximum extrusion rate possible for the film made from the blend.

Similar results to Examples 1 and 2 can be obtained with lesser and greater amounts of LDPE blended with the LLDPE copolymers described herein. The relatively high level of LDPE used in the Examples also provides economy to the resultant film in that LDPE is less expensive than the LLDPE copolymer.

As many widely different embodiments of this invention may be made without departing from the spirit and scope thereof, it is to be understood that this invention is not limited to the specific embodiments thereof except as defined in the appended claims.

What is claimed is:

1. In an improved process for manufacturing satisfactorily drawn heat shrinkable films, which process comprising the steps of:

a) blending:

i) about 50 to 95 percent by weight of a single melting point, linear low density ethylene copolymer (LLDPE) having a density from about 0.900 to about 0.935 g/cc, and ii) about 5 to 50 percent by weight of a branched low density polyethylene LDPE having a density in the range of about 0.920 to about 0.925 g/cc and a branch structure produced by high pressure polymerization using a free radical initiator, b) extruding the blend through a die to make a tubular sheet or film at an extrusion temperature greater than about 215° C., and c) heating the tubular sheet or film to its orientation temperature range, and d) substantially uniformly stretching the tubular sheet or film to accomplish orientation;

the improvement which comprises:

accomplishing said stretching by expanding said tubular sheet or film to form a bubble and advancing the expanded tube of the film at a faster rate than the extrusion rate, to obtain a stretch of at least 3.5× in the machine direction and at least 3× in the transverse direction.

2. The improved process of claim 1, in which said tubular sheet or film is heated to an orientation temperature, wherein the orientation temperature is not higher than 10° C. below the melting point of said film.

3. The improved process of claim 1 in which:
a) the density of the LLDPE is at least about 0.918 g/cc; and
b) about 5% to about 20% by weight of the LLDPE copolymer is derived from 1-hexene or 1-octene.

4. The improved process of claim 3 in which:
a) the LDPE has a molecular weight distribution ($M_w/M_n$) of at least 8 and a melt index of about 1 to about 3 g/10 min; and
b) the melting point of the LDPE is below the melting point of the LLDPE by 10° C. or more.

* * * * *

UNITED STATES PATENT AND TRADEMARK OFFICE
CERTIFICATE OF CORRECTION

PATENT NO. : 5,904,964
DATED : May 18, 1999
INVENTOR(S) : John Douglas Snyder It is certified that error appears in the above-identified patent and that said Letters Patent is hereby corrected as shown below:

Column 8, line 58, claim 1 a) ii) - delete [LDPE]; add --(LDPE)--

Signed and Sealed this

Eleventh Day of April, 2000

*Attest:*

Q. TODD DICKINSON

*Attesting Officer*     *Director of Patents and Trademarks*